United States Patent
Park et al.

(10) Patent No.: US 6,528,031 B1
(45) Date of Patent: Mar. 4, 2003

(54) METHOD FOR PREPARING NOBLE METAL-SUPPORTED ZEOLITE CATALYST FOR CATALYTIC REDUCTION OF NITROGEN OXIDE

(75) Inventors: Sang Eon Park, Daejeon (KR); Yong Ki Park, Daejeon (KR); Jin Woo Lee, Daejeon (KR); Chul Wee Lee, Daejeon (KR); Jong San Chang, Daejeon (KR); Jung Kuk Cho, Seoul (KR)

(73) Assignee: Korea Research Institute of Chemical Technology, Daejeon (KR)

(*) Notice: Subject to any disclaimer, the term of this patent is extended or adjusted under 35 U.S.C. 154(b) by 0 days.

(21) Appl. No.: 09/476,238

(22) Filed: Dec. 30, 1999

(30) Foreign Application Priority Data

Dec. 31, 1998 (KR) .......................................... 1998-64109

(51) Int. Cl.$^7$ .......................... B01J 29/068; B01J 29/06; C01B 21/24
(52) U.S. Cl. .......................... 423/239.2; 502/62; 502/64; 502/65; 502/66; 502/71; 502/73; 502/74; 502/77; 502/79
(58) Field of Search .............................. 502/60, 64, 65, 502/66, 71, 73, 74, 77, 79, 62; 423/239.2

(56) References Cited

U.S. PATENT DOCUMENTS

| | | | |
|---|---|---|---|
| 4,205,053 A | * | 5/1980 | Rollman et al. |
| 4,472,516 A | * | 9/1984 | Frenken |
| 4,677,239 A | * | 6/1987 | Dewing et al. |
| 5,164,350 A | | 11/1992 | Abe et al. .................... 502/66 |
| 5,208,198 A | * | 5/1993 | Nakano et al. |
| 5,234,872 A | * | 8/1993 | Apelian et al. |
| 5,236,879 A | * | 8/1993 | Inoue et al. |
| 5,330,732 A | * | 7/1994 | Ishibashi et al. |
| 5,412,946 A | | 5/1995 | Oshima et al. ............... 60/286 |
| 5,427,989 A | | 6/1995 | Kanesaka et al. ............ 502/66 |
| 5,684,207 A | * | 11/1997 | Chen et al. |
| 5,727,385 A | | 3/1998 | Hepburn ...................... 60/297 |
| 5,830,421 A | | 11/1998 | Gardner et al. .......... 423/213.2 |
| 5,897,846 A | * | 4/1999 | Kharas et al. |
| 5,968,870 A | * | 10/1999 | Iizuka et al. ................ 502/302 |
| 6,025,296 A | * | 2/2000 | Takemoto et al. |
| 6,080,377 A | * | 6/2000 | Deeba et al. |
| 6,084,096 A | * | 7/2000 | Li et al. |

FOREIGN PATENT DOCUMENTS

KR          10-0193380          5/1998

OTHER PUBLICATIONS

Burch, R., et al., "A Comparative Investigation of the Reduction of NO by $CH_4$ on Pt, Pd, and Rh Catalysts," *Appl. Catal. B: Environmental* 15 (1998) pp. 49–62.

Descorme, C., et al., "Catalytic Reduction of Nitric Oxide by Methane in the Presence of Oxygen on Palladium–Exchanged Mordenite Zeolites," *J. Catal.*, vol. 177 (1998) pp. 352–362.

Lee, J.H., et al., "Catalytic Combustion of Methane", *Fuel Processing Technology*, vol. 42 (1995) pp. 339–359.

Li, Y., et al., "Catalytic Reduction of Nitrogen Oxides with Methane in the Presence of Excess Oxygen", Applied Catalysis B: Environmental, vol. 1 (1992) pp. L31–L40.

Misono, M., "Catalytic Reduction of Nitrogen Oxides by Bifunctional Catalysts," *Cattech.* (Jun. 1998) pp. 53–69.

Nishizaka, Y., et al., "Essential Role of Acidity in the Catalytic Reduction of Nitrogen Monoxide by Methane in the Presence of Oxygen over Palladium–Loaded Zeolites," *Chemistry Letters* (1994) pp. 2237–2240.

Park, S.E., "Selective Catalytic Reduction of NO over Metal Oxides Incorporated Zeolites," *React. Kinet. Catal. Lett.*, vol. 57, No. 2 (1996) pp. 339–348.

Yan, J.–Y., et al., "Synergistic Effect in Lean $No_x$ Reduction by $CH_4$ over $Co/Al_2O_3$ and H–Zeolite Catalysts," *J. Catal.*, vol. 175 (1998) pp. 294–301.

\* cited by examiner

*Primary Examiner*—Stanley S. Silverman
*Assistant Examiner*—Christina Ildebrando
(74) *Attorney, Agent, or Firm*—Ladas & Parry

(57) ABSTRACT

The present invention provides a method for preparing a catalyst for the reduction of nitrogen oxides by the use of natural gas as a reducing agent in an excess oxygen atmosphere, which comprises of filling zeolite with an organic compound having molecular weight of 100~250 prior to loading catalytically active noble metal components on a zeolite. Since the method according to the present invention supports catalytic active noble metal components on a zeolite under the condition that the pores of zeolite are filled with organic compounds, the noble metal component, which is essential for forming highly active NOx reduction catalyst, can be supported precisely on the desired positions of zeolite pores. Therefore, the NOx reduction catalysts prepared by the present invention are very useful for the purification of exhaust gas in an excessive oxygen atmosphere such as gas turbines, boilers or lean-burn automobiles.

57 Claims, No Drawings

METHOD FOR PREPARING NOBLE METAL-SUPPORTED ZEOLITE CATALYST FOR CATALYTIC REDUCTION OF NITROGEN OXIDE

BACKGROUND OF THE INVENTION

1. Field of the Invention

The present invention relates to a method for preparing a noble metal-supported zeolite catalyst for selective reduction of nitrogen oxides exhausted under excess oxygen conditions. In particular, the present invention relates to a method for preparing a noble metal-supported zeolite catalyst effective for catalytic reduction of nitrogen oxides with methane, which comprises of filling the pores of zeolite with organic compounds prior to supporting active noble metal catalyst components on the zeolite. Through this preparation method, it is possible to locate noble metal components, which is essential for the designing of highly active catalysts for reduction of nitrogen oxides, precisely on the desired positions of zeolite pores.

2. Description of the Prior Art

Since Armor et al reported that nitrogen oxides (NOx) could be selectively reduced over a cobalt ion-exchanged Co-ZSM-5 catalyst by using methane as a reducing agent (Y. Li, and J. Armor, *Appl. Catal.* B 1 (1992) L31), it was recognized that the activation temperature of hydrocarbons is closely related with the temperature window and the activity of the selective reduction (SCR) of NOx. Accordingly, the research to develop noble metal-supported catalysts, for example platinum or palladium-supported catalysts having a high methane oxidation activity under a lean-bum condition for the SCR of nitrogen oxides has been actively carried out (Y. Nishizaka, and M. Misono, *Chemistry Letter*, 2237 (1994); J. H. Lee, and D. L. Trimm, *Fuel Processing Tech.*, 42 (1995) 339). The said noble metal catalysts are supported on a support such as silica, zirconia, titanium and zeolite but their catalytic performance depends significantly on the types of supports. The catalysts supported on a non-microporous support such as alumina, silica, zirconia and titanium exhibit poor activity in excess oxygen atmosphere where oxygen content is 30% or more, while the catalysts supported on a zeolite having regular size of micropores maintain high SCR activity of NOx in excess oxygen atmosphere (R. Burch, and A. Ramli, *Appl. Catal.* B, 15 (1998) 49). Accordingly, it is thought that such noble metal-supported zeolite catalysts will become more and more important for the treatment of the exhaust gases from fixed sources excess oxygen such as gas turbines or boilers, or lean-bum engines.

A number of NOx-SCR catalysts wherein catalytic active noble metals such as platinum, palladium and rhodium supported on a zeolite and processes employing said catalysts have been suggested. Kanesaka et al. of Nissan Motor Co., Ltd., disclosed a catalyst comprising first layer of mononith coated with platinum, palladium or rhodium catalyst supported on alumina and second layer coated with copper or cobalt ion-exchanged on ZSM-5, mordenite or ferrierite, which showed excellent catalytic performance for the treatment of exhaust gas from lean-burn engines (U.S. Pat. No. 5,427,989 (1995)). Abe et al. of NGK Insulator, Ltd., tried to increase thermal stability of the noble metal supported zeolite catalysts by mixing them with alumina, titania, zirconia or silica (U.S. Pat. No. 5,164,350 (1992)). In addition, Oshima et al. of Toyota Jidosha Kabushiki Kaisha disclosed a NOx-SCR process based on Pt ion-exchanged zeolite catalyst working in internal combustion engines at the temperature range of 100 to 150° C., in which hydrogen was used as a reductant produced from methanol over a Cu-Ni-Cr/alumina reforming catalyt (U.S. Pat. No. 5,412,946 (1995)). Recently, Gardner et al. of Low Emissions Technologies Research and Development Partnership proposed a catalyst comprising a metal hydrate support such as titanium and zirconium doped with platinum, palladium, or a combination of these working in high oxidizing atmosphere and when the said catalyst was modified with an alkali or an alkaline earth metals further improvement brought in catalytic activity (U.S. Pat. No. 5,830,421, (1998)). Hepburn et al. of Ford Global Technology improved NOx-SCR activity by adding a NOx trapping material to a SCR catalyst comprising of Co, Cu, Pt, Au or Ag loaded on a zeolite or a heat resistant oxide. That is, Hepburn et al. succeeded in improving the NOx reduction performance of the catalyst by providing a noble metal-supported porous material to contact with exhaust gas for absorbing NOx prior to be reduced by the reductant (U.S. Pat. No. 5,727,385 (1998)).

As discussed above, since the noble metal supported on non-microporous supports are too simple in their catalytic functions to reduce selectively the NOx in excess oxygen condition, there have been an effort to design hybrid type catalysts comprising of a hydrocarbon oxidation site such as highly dispersed noble metal and a NOx reduction sites such as metal ion-exchanged micorporous zeolite through the introduction of adsorption capability of NOx. The said approaches contributed to increase catalytic activity at low temperature but there still remains further improvement lo bring sulfur resistance to the catalyst.

THE INVENTION

The objective of this invention is to provide a preparation method of NOx-SCR catalyst of which catalytic activity has increased by two times or more compared to that of conventional catalysts. In the present invention, in order to load noble metal components on a zeolite support, a new supporting method has been adopted different from simple impregnation or ion-exchange methods employed in the prior conventional methods. When the noble metals are supported on a zeolite according to the present invention, the expensive noble metals can be highly and precisely dispersed around the microporous zeolite compared to conventional methods. The prepared supported catalysts exhibit excellent NOx reduction activity more than two tunes higher than that of conventional catalysts especially in excess oxygen atmosphere.

The term "NOx reduction catalysts" means the catalysts capable of selectively reducing nitrogen oxides by the use of natural gas as a reducing agent in the presence of excess oxygen. The present invention is based on the concept of bifunctional catalyst proposed by Sang-Eon Park and Misono et al. Namely, the catalyst of the present invention is based on the result that the co-existence of two catalytic components capable of oxidizing hydrocarbons and reducing nitrogen oxides through the interaction with these activated hydrocarbons brought synergistic effect in catalytic activity, thereby making it possible to provide an efficient catalyst for selective reduction of nitrogen oxides (S.-E. Park, *React. Kinef. Catal. Lett.*, 57 (1996) 339; J.-Y. Yan, H. H. Kung, W. M. H. Sachtler and M. C. Kung, *J. Catal.*, 175 (1998) 294; C. Descorme, P. Gelin, C, leuyer and M. Primet. *J. Catal.*, 177 (1998) 352.). Several types of preparation methods have been proposed to combine these two catalytic functions into one. The first is a method of physically mixing a noble metal component having excellent oxidizing activity with ion-exchanged zeolite catalysts having high NOx reduction capability. The second is a method of supporting an excess amount of noble metal catalyst component to a support (Korean patent application No. 96-956; M. Misono, Cattech. June (1998) 53). However, these two methods are not efficient to design a low temperature NOx-SCR catalyst working in excess oxygen condition.

Therefore, the objective of present invention is to provide a preparation method of NOx-SCR catalyst working with methane reductant at low temperature of 400° C. or less.

The other objectives and features of the present invention will become apparent to those skilled in the art from the following detailed description. It should be understood, however, that the detailed description and specific examples, while indicating preferred embodiments of the present invention are given by way of illustration and not limitation. Many changes and modifications within the scope of the present invention may be made without departing from the spirit thereof, and the invention includes all such modifications.

The present invention relates to a method of preparing a catalyst for selective reduction of nitrogen oxides using natural gas as a reducing agent in the presence of excess-oxygen, which comprises filling zeolite's micropores with organic compounds having molecular weight of 100 to 250 prior to loading catalytically active noble metal components on a zeolite.

Since the catalytically active noble metal components could be loaded on the zeolite under the pores of which are filled with organic compounds, the noble metal component essential for hydrocarbon activation can be supported precisely on the desired positions of zeolite's pores.

The catalyst prepared by this new method exhibits higher NOx reduction activity compared to the catalysts prepared by the conventional impregnation method in which activated noble metal components are loaded on a support micropores of which are not protected by organic compounds. In other words, the catalyst prepared in the present invention is able to reduce NOx selectively by the natural gas as a reducing agent in the presence of excess oxygen with high activity. This prepared catalyst is helpful to remove NOx from exhaust gas containing excessive oxygen such as lean burn engines or stationary sources like gas turbines or boilers.

In particular, the present invention provides a catalyst for selective catalytic reduction of NOx in oxidizing atmosphere by hydrocarbons, which are inexpensive and safe, as a reducing agent. The present invention also provide a highly active NOx-SCR catalyst working with natural gas, which is the most economical, as a reducing agent. Since the natural gas consists of 85% or more of methane which is a very stable hydrocarbon, at least 450° C. is required for the natural gas to be used as a reducing agent. In addition, it is known that only limited catalysts such as Pt, Pd, Co and Ga show reaction activity with natural gas.

The said noble metal component can be a mixture of at least one or two selected from the group consisting of transition metals of VIII and IB groups of the periodic table, such as platinum, palladium, rhodium and gold. When two kinds of noble metals are mixed (AxBy), x is preferably 0.5 to 0.99 and y is preferably 0.01 to 0.5. It is particularly preferred that A is palladium or gold and B is rhodium or iridium. The content of active noble metal component supported is 0.3 to 2.0% by weight based on the total catalyst weight under dried conditions.

To protect the micropore of zeolite and locate active metal components near the external site of zeolite, an organic compound having molecular weight of 100~250 is used such as alcohols or amines having secondary propyl, t-butyl or t-pentyl groups, or salts of amines having secondary propyl, t-butyl or t-pentyl groups with OH, Cl, Br or I, or quinone. The most preferable form of organic compounds is one of tetrapropyl ammonium hydroxide (hereinafter referred to as "TPAOH"), tetrapropyl ammonium bromide (hereinafter referred to as "TPABr"), tetrabutyl ammonium hydroxide (hereinafter referred to as "TBAOH"), tetrabutyl ammonium bromide (hereinafter referred to as "TBABr"). These organic compounds are added to the zeolite in the form of solution corresponding to the exact pore volume of zeolite so that 0.5 to 5 mole of organic compounds can be added per mole of Al consisting zeolite skeletal.

Said zeolite is preferably one of H-type zeolite such as BEA, MFI and USY having Si/Al ratio of 10~100.

The alkaline earth metal or transition metal such as titania, vanadia and ceria can be added further together with said active noble metal components in an amount of 0.5~5.0% by weight on the basis of total dried catalyst weight. The metal oxides of vanadia or ceria are capable of improving the oxidizing capability of the catalyst; and metal oxides such as titania are capable of increasing the dispersion of the supported noble metal components.

As a method for loading active noble metal components on zeolite micropore of which is filled with organic compounds, an impregnation method and ion-exchange method explained below are particularly preferred.

(1) Impregnation Method

A solution in which noble metal components are dissolved (10~30 ml/g catalyst), preferably an aqueous solution containing noble metal salts corresponding to a ratio of 5~10 ml per 1 g of zeolite is poured on a zeolite. The zeolite slurry solution is stirred for 1~4 hours at 50~70° C. and then the solvent is removed by a vacuum evaporating method, for example, using a rotary vacuum evaporator, thereby supporting catalytically active noble metal component on a zeolite.

(2) Ion-exchange Method

A solution in which noble metal components are dissolved (50~1000 ml/g catalyst), preferably an aqueous solution containing noble metal salts corresponding to a ratio of 300~500 ml per 1 g of zeolite is poured on a zeolite. The zeolite slurry solution is stirred for 12~24 hours for ion-exchange, and then washed and dried. To remove the noble metal salts remaining at the external site of the catalyst, the catalyst after ion-exchange is sufficiently washed with distilled-water in a filter flask.

The supported catalyst is dried at 100~150° C. for 3~5 hours and then is subjected to be calcined at 400~600° C. for 3~6 hours in air atmosphere for activation. When the calcination temperature is less than 400° C. or the calcination time is too short, the metal components are not dispersed well around the zeolite, thereby deteriorating the activity of NOx reduction. Meanwhile, if the calcination temperature is excessively high over 700° C., the structure of the catalyst is destroyed, thereby deteriorating the efficiency of NOx reduction.

In order to prepare catalysts loaded with two or more of catalytic active noble metals, a solution containing two or more of active metals is made, which is then loaded on a zeolite in the same manner as the said impregnation method. The catalysts in which two or more of active metals such as Pt—Pd, Pt—Rh, Pd—Rh or Pd—Ag are loaded on a zeolite revealed activity much higher than that of single metal component. The loading ratio of these two metals are between 0.1 to 0.9 expressed as molar ratio.

The obtained noble metal-supported zeolite catalyst is finally subjected to calcine treatment at 400~600° C. in air atmosphere for its activation.

The present invention is also related with a catalyst for the reduction of nitrogen oxides prepared by the method mentioned above.

The nitrogen oxides can be removed by way of NOx-SCR using the said catalyst prepared by the present invention under the reaction conditions as follows the mixed volume ratio of NO:natural gas: oxygen is 1: (0.1~10): (10~1000) and the space velocity is 10,000~50,000 $h^{-1}$. The preferable ratio of natural gas: oxygen is 1: (20~100). If the ratio is less than 1, the activity of the catalyst deteriorates. Meanwhile, if the ratio is more than 100, it lacks economic advantage.

As a reducing agent, natural gas having 1 or more carbon atoms or mixtures thereof can be used. The major component of natural gas is methane and this is used as a reducing agent for the reduction of nitrogen oxides.

Generally, for the preparation of NOx-SCR catalysts, a physical mixing method in which catalytically active components having different functions are physically mixed is employed. However, the present invention improves the loading method of active metal components on zeolite through the mixing in molecular level while maintaining functions of each catalytic components.

When the temperature for SCR is 400° C. or less, no catalytic activity is observed due to no activation of natural gas. When the temperature is excessively high over 600° C., the reducing agent is oxidized with oxygen to form carbon dioxide, thereby deteriorating the SCR activity.

In order to determine the SCR activity, the catalysts were activated at 400~600° C. in an oxygen atmosphere for 3 hours. A mixed gas consisting of NO, natural gas, oxygen and helium was introduced through a mass flow controller at GHSV of 10,000~50,000 $h^{-1}$ and then the NOx reduction is carried out at 400~550° C. for 100 hours. The conversion of NOx was 85%.

The present invention is also related with a catalyst DeNOx system installed in stationary sources such as gas turbines or boilers or mobile sources for removal of NOx in exhaust gas. This DeNOx catalyst system can be installed on the conventional stationary or mobile sources for the purification of exhaust gas.

The method for the preparation of a NOx reduction catalyst and the application of that catalyst in the DeNOx are explained in detail by means of the working examples, but the content and scope of the present invention is not limited by any means thereby.

EXAMPLE 1

Preparation of β-zeolite Catalyst Impregnated with Palladium $PdCl_2$ was dissolved in ammonia water and then the resulting solution was subjected to impregnation on β-zeolite ($SiO_2/Al_2O_3$=25). In order to prevent the loading of $PdCl_2$ on micropores of zeolite during the loading of active metal component on zeolite, the micropores were previously protected with organic material. Namely, in order to protect the micropores, 50 ml of 0.5N tertiary-butyl alcohol was introduced to 10 g of β-zeolite, stirred for 5 hours and then washed with sufficient distilled water. The tertiary-butyl alcohol-protected zeolite was dried and then introduced into 200 ml $PdCl_2$ solution wherein 0.165 g of $PdCl_2$ and 40 ml of 28% ammonia water were dissolved, and then stirred at room temperature for 3 hours. After sufficient stirring, the resulting mixture was subjected to stirring in a vacuum evaporator at 70° C. for 3 hours, which result in 1% by weight of palladium-loaded β-zeolite catalyst (hereinafter referred to as "1.0PdB/BEA"). The prepared catalyst was dried at 120° C. for 12 hours and then subjected to calcination at 500° C. for 5 hours in an oxygen atmosphere.

COMPARATIVE EXAMPLE 1

Comparison Between the Use and Non-use of Organic Material for Protecting Micropore of Zeolite The impregnation of palladium was carried out same procedure as in Example 1 except that the micropore of β-zeolite was not protected with t-butyl alcohol. Namely, 10 g of β-zeolite was impregnated with 200 ml $PdCl_2$ solution wherein 0.165 g of $PdCl_2$ and 40 ml of 28% ammonia water were dissolved and then dried by way of vacuum evaporating method (hereinafter referred to as "1.0PdC/BEA"). The same drying and calcination steps were employed as in Example 1.

COMPARATIVE EXAMPLE 2

Comparison Between Organic Materials for Protecting Micropore of Zeolite

The same procedure as in Example 1 was applied except that tetrapropyl ammonium hydroxide (hereinafter referred to as TPAOH) was used in place of t-butyl alcohol for the protection of micropore of zeolite. Namely, in order to protect micropore of zeolite, 50 ml of 0.5N TPAOH solution was added to 10 g of β-zeolite and stirred for 5 hours and then washed with sufficient distilled water. Other procedures for loading palladium were the same as used in Example 1 (hereinafter referred to as "1.0PdT/BEA").

COMPARATIVE EXAMPLE 3

Comparison with Catalysts Prepared by Incipient Wetness Method

Palladium was loaded by way of incipient-wetness method described in Example 1 of Korean Patent Application Number 96-956. Namely, 0.165 g of $PdCl_2$ was dissolved in 18 ml of 28% ammonia water corresponding to the micropore volume of 10 g zeolite. To prepare an anhydrous β-zeolite, 10 g of dried β-zeolite was dried at 120° C. for 2 hours and then stored in a desiccator. To this anhydrous support said $PdCl_2$ solution was added dropwise until the support to be wetted. Then the prepared catalyst was dried at 120° C. for 12 hours to obtain β-zeolite catalyst wherein 1% by weight of palladium was loaded (hereinafter referred to as "1.0PdCW/BEA").

EXAMPLE 2

Preparation of β-zeolite Catalyst Impregnated with Platinum

The same procedure as in Example 1 was repeated except that platinum was impregnated in place of palladium. Namely, 200 ml aqueous solution dissolved with 0.21 g $H_2PtCl_6$ and 18 ml of 28% ammonia water were prepared and then added to the β-zeolite micropore of which was protected with t-butyl alcohol. The β-zeolite impregnated with 1% by weight of platinum was prepared after drying and calcination (hereinafter referred to as "1.0PtB/BEA"). The drying and calcination were carried out same as in Example 1.

EXAMPLE 3

Preparation of β-zeolite Catalyst Impregnated with both Palladium and Rhodium

The same procedure as in Example 1 was repeated except that 20% by weight of palladium was replaced with rhodium in impregnation. Namely, 200 ml aqueous solution wherein 0.05 g of $RhCl_3.xH_2O$ (corresponding to 20% by weight of palladium) together with 0.132 g of $PdCl_2$ and 40 ml of 28% ammonia water were dissolved was added to β-zeolite the micropore of which was protect with t-butyl alcohol and then dried in vacuum evaporator. β-zeolite impregnated with 0.8% by weight of platinum and 0.2% by weight of rhodium was prepared (hereinafter referred to as "0.8 Pd-0.2RhB/BEA"). The drying and calcination were carried out same as in Example 1.

EXAMPLE 4

Preparation of β-zeolite Catalyst Impregnated with both Platinum and Rhodium

The same procedure as in Example 3 was carried out except that platinum and rhodium were impregnated in place of palladium-rhodium. Namely, 200 ml aqueous solution wherein 0.168 g of $H_2PtCl_6$ and 0.05 g of $RhCl_3.xH_2O$ (corresponding to 20% by weight of platinum) were dissolved was added into β-zeolite the micropore of which was protected with t-butyl alcohol and then dried in vacuum evaporator. β-zeolite impregnated with 0.8% by weight of platinum and 0.2% by weight of rhodium was prepared (hereinafter referred to as "0.8Pt-0.2RhB/BEA"). The drying and calcination were carried out in the same manner as in Example 1.

EXAMPLE 5

Preparation of β-zeolite Catalyst Impregnated with both Gold and Rhodium

The same procedure as in Example 4 was repeated except that gold and rhodium were impregnated in place of palladium-rhodium. Namely, 200 ml aqueous solution, in which 0.138 g of $HAuCl_4.xH_2O$ and 0.05 g of $RhCl_3.xH_2O$ (corresponding to 40% by weight of Au) were dissolved, was added into β-zeolite the micropore of which was protected with t-butyl alcohol and then dried in vacuum evaporator. β-zeolite impregnated with 0.8% by weight of gold and 0.2% by weight of rhodium was prepared (hereinafter referred to as "0.8Au-0.2RhB/BEA"). The drying and calcination were carried out in the same manner as in Example 1.

EXAMPLE 6

Preparation of Palladium-Cerium Supported β-zeolite Catalyst

In order to improve the oxidation power of the catalyst prepared in Example 1, cerium was impregnated together with palladium. That is, 10 g of β-zeolite impregnated with palladium and cerium was prepared in the same manner as in Example 1. 200 ml aqueous solution in which 0.165 g of $PdCl_2$ and 0.310 g of $Ce(NO_3)_2.6H_2O$ was dissolved was added into 10 g of β-zeolite and then dried and calcined at 120° C. and at 550° C., respectively. β-zeolite impregnated with 1% by weight of palladium and 1% by weight of cerium was obtained ("1.0Ce-1.0PdB/BEA").

EXAMPLE 7

Preparation of Titanium-palladium Supported β-zeolite Catalyst

The same procedure as in Example 6 was repeated except that 2% by weight of titanium was impregnated in place of cerium in order to improve dispersion of palladium. Namely, 10 g of β-zeolite was added into 200 ml of isopropyl alcohol solution in which 1.8 g of $Ti[OCH(CH_3)_2]_4$ together with 0.165 g of $PdCl_2$ were dissolved (hereinafter referred to as "2.0Ti-1.0PdB/BEA").

EXAMPLE 8

Preparation of H-ZSM-5 Catalyst Ion-exchanged with Palladium

Palladium ion-exchanged H-ZSM-5 was prepared using ion-exchanged method instead of impregnation method of Example 1. Namely, 10 g of H-ZSM-5 ($SiO_2/Al_2O_3$=30) micropore of which was were protected with t-butyl alcohol same as in Example 1 was added into 1000 ml of aqueous solution wherein 0.330 g of $PdCl_2$ and 160 ml of 28% ammonia water were dissolved. Then it was stirred for 12 hours at room temperature for ion-exchange and then washed with sufficient distilled water. The drying and calcination were carried out in the same was as in Example 1. 10 g of ZSM-5 ion-exchanged with 2% by weight of palladium was obtained (hereinafter referred to as "2.0PdB-I/MFI").

COMPARATIVE EXAMPLE 4

Comparison Between the Use and Non-use of Organic Material for Protecting Micropores The H-ZSM-5 was ion-exchanged with palladium same as in Example 8 except that the micropore of H-ZSM-5 was not protected with t-butyl alcohol. Namely, 10 g of H-ZSM-5 was ion-exchanged with 1000 ml of aqueous solution wherein 0.330 g of $PdCl_2$ and 160 ml of 28% ammonia water were dissolved (hereinafter referred to as "2.0Pd-I/MFI"). The same drying and calcination steps were employed as in Example 8.

COMPARATIVE EXAMPLE 5

Comparison Between Organic Materials for Protecting Micropores

The same procedure as in Example 8 was repeated except that TPAOH (tetrapropyl ammonium hydroxide) was used in order to protect micropore of zeolite instead of t-butyl alcohol. Namely, in order to protect micropore of zeolite, 50 ml of 0.5N TPAOH solution was added to 10 g of H-ZSM-5 while stirring for 5 hours and then washed with sufficient distilled water. Other procedures were carried out same as in Example 8 (hereinafter referred to as "2.0PdT-I/MFI").

EXAMPLE 9

Preparation of H-ZSM-5 Catalyst Ion-exchanged with Platinum

The same procedure as in Example 8 was repeated except that platinum was ion-exchanged in place of palladium.

Namely, 10 g of H-ZSM-5 the micropore of which was protected with t-butyl alcohol was added into 1000 ml of solution wherein 0.21 g of $H_2PtCl_6$ was dissolved and then was subjected to ion-exchange for 12 hours while stirring at room temperature. The washing, drying and calcination were done same as in Example 8.10 g of ZSM-5 ion-exchanged with 1% by weight of platinum was prepared (hereinafter referred to as "1.0PtB-I/MFI").

EXAMPLE 10

Preparation of H-ZSM-5 Catalyst Ion-exchanged with Gold

The same procedure as in Example 8 was repeated except that gold was ion-exchanged in place of palladium. Namely, 10 g of H-ZSM-5 the micropore of which was protected with t-butyl alcohol was added into 1000 ml of solution in which 0.172 g of $HAuCl_4 \cdot xH_2O$ was dissolved and then ion-exchange for 12 hours while stirring at room temperature. The washing, drying and calcination was done same as in Example 8. 10 g of ZSM-5 ion-exchanged with 1% by weight of gold was prepared (hereinafter referred to as "1.0AuB-I/MFI").

Measurement of Catalytic Activity

The reaction activity was measured in an electric furnace equipped with PID temperature controller by filling 0.30 g of catalyst prepared in said Examples and Comparative Examples into a quartz reactor. The catalysts were pretreated with hydrogen at 200° C. for 6 hours and then with 150 cc/min helium at the same temperature for 2 hours. The catalytic activity was measured at a wanted temperature while introducing a mixed gas consisting of 1500 ppm of NO, 4500 ppm of natural gas and 3% oxygen at a flow rate of 200 cc/min.

The conversion rate of nitrogen oxides(NOx) is calculated from the following equation:

$$\text{Conversion of nitrogen oxides (\%)} = \frac{\text{Input concentration of NOx} - \text{Output concentration of NOx}}{\text{Input concentration of NOx}} \times 100$$

NOx−Output concentration of NOx×100 Input concentration of NOx

EXPERIMENT 1

The NOx-SCR activity of the noble metals impregnated or ion-exchanged zeolite catalysts, prepared in Examples 1 to 10 and Comparative Examples 1 to 5 are summarized in Tables 1 and 2 according to their preparation methods.

TABLE 1

NOx-SCR activity of noble metal impregnated zeolite catalysts

| | | NOx Reduction Rate (%) | | | | | | |
|---|---|---|---|---|---|---|---|---|
| | Catalysts | 350° C. | 400° C. | 450° C. | 500° C. | 550° C. | 600° C. | 650° C. |
| Ex. 1 | 1.0PdB/BEA | 5.2 | 17.5 | 42.5 | 73.4 | 53.0 | 28.9 | 13.6 |
| Com. Ex. 1 | 1.0PdC/BEA | 3.7 | 7.7 | 15.6 | 27.8 | 48.1 | 37.1 | 17.3 |
| Com. Ex. 2 | 1.0PdT/BEA | 20.4 | 40.8 | 58.7 | 68.3 | 70.6 | 70.9 | 50.0 |
| Com. Ex. 3 | 1.0PdCW/BEA | 2.5 | 5.3 | 13.7 | 26.1 | 38.1 | 31.2 | 19.1 |
| Ex. 2 | 1.0PtB/BEA | 7.7 | 18.7 | 36.6 | 50.8 | 51.6 | 52.5 | 43.6 |
| Ex. 3 | 0.8Pd-0.2RhB/BEA | 17.5 | 53.3 | 75.3 | 70.6 | 61.6 | 54.0 | 34.6 |
| Ex. 4 | 0.8Pt-0.2RhB/BEA | 33.7 | 64.9 | 66.0 | 61.4 | 44.4 | 25.4 | 6.2 |
| Ex. 5 | 0.8Au-0.2RhB/BEA | 14.2 | 39.7 | 54.6 | 59.4 | 62.0 | 54.3 | 27.1 |
| Ex. 6 | 1.0Ce-1.0PdB/BEA | 42.2 | 69.3 | 81.7 | 78.6 | 71.9 | 54.1 | 34.1 |
| Ex. 7 | 2.0Ti-1.0PdB/BEA | 29.1 | 59.8 | 78.6 | 85.3 | 83.0 | 74.1 | 57.1 |

TABLE 2

NOx-SCR activity of noble metals ion-exchanged zeolite catalysts

| | | NOx Reduction Rate (%) | | | | | | |
|---|---|---|---|---|---|---|---|---|
| | Catalysts | 350° C. | 400° C. | 450° C. | 500° C. | 550° C. | 600° C. | 650° C. |
| Ex. 8 | 2.0PdB-I/MFI | 5.2 | 17.5 | 42.5 | 73.4 | 53.0 | 28.9 | 13.6 |
| Com. Ex. 4 | 2.0PdC-I/MFI | 2.0 | 4.5 | 8.7 | 10.7 | 17.3 | 15.2 | 10.3 |
| Com. Ex. 5 | 2.0PdT-I/MFI | 20.4 | 40.8 | 58.7 | 68.3 | 70.6 | 70.9 | 50.0 |
| Ex. 9 | 1.0PtB-I/MFI | 4.9 | 16.3 | 35.5 | 61.7 | 59.2 | 43.0 | 27.2 |
| Ex. 10 | 1.0AuB-I/MF1 | 11.8 | 23.1 | 34.8 | 53.2 | 52.0 | 48.8 | 36.3 |

Effects of the Invention

Tables 1 and 2 summarize the NOx-SCR activity of zeolite catalysts impregnated or ion-exchanged with noble metals such as palladium, platinum or rhodium depending on the methods of micropore of zeolite, the types of modifier and the types of lading metal or methods. The catalysts wherein metals are loaded by conventional ion-exchange or impregnation methods show maximum activity at 500 to 600° C. In contrast, the catalysts prepared by present invention, in which the micropores of zeolite was protected with organic material prior to noble metal loading, show excellent activity even at lower temperature.

The present invention suggests a method for preparing a catalyst by loading palladium or metal oxides under the condition that the micropores of the support are protected with organic materials. The catalysts prepared in Example 1 and Examples 4 to 7 showed much better NOx-SCR activity than that of the catalysts prepared in Com. Examples 1 and 3. For example, 74% NOx conversion was obtained at 500° C., GHSV=30,000 h$^{-1}$ in 3% oxygen atmosphere over the 1.0PdB/BEA while 28% NOx conversion over 1.0PdC/BEA or 1.0PdW/BEA.

It can be understood that by loading the noble metals on the zeolite protected with organic compound it is possible to locate the noble metals having excellent oxidation activity preferentially on the external site of the zeolite, which renders the oxidation of natural gas occurring at low temperatures, thereby resulting in the improvement of NOx-SCR activity. Therefore, the NOx-SCR catalysts prepared by the present invention are very useful for the purification of exhaust gas in an excess oxygen such as gas turbines, boilers and lean-burn automobiles.

What is claimed is:

1. A method for preparing a catalyst for reduction of NO$_x$ with natural gas as a reducing agent in an excess oxygen atmosphere, wherein the method comprises filling zeolite with an organic compound having a molecular weight of 100–250 prior to loading a catalytically active noble metal component on the zeolite, wherein the organic compound comprises one or more alcohols having a secondary propyl, butyl, or pentyl group.

2. A method as claimed in claim 1 in which said noble metal component comprises at least one or two metal components selected from the group consisting of metals of groups VIII and IB of the Periodic Table of the Elements.

3. A method as claimed in claim 2 in which a mixture A$_x$B$_y$ is formed when the two metal components are mixed, wherein x is 0.5–0.99 and y is 0.01–0.5, wherein A is palladium or gold, and wherein B is rhodium or iridium.

4. A method as claimed in claim 2, wherein the group of metal components consists of platinum, palladium, rhodium, and gold.

5. A method as claimed in claim 1 in which said zeolite comprises an H-type zeolite having a BEA, MFI, or USY structure with an Si/Al ratio of 10–100.

6. A method as claimed in claim 1, wherein the catalyst has a total weight, wherein the zeolite has a pore volume and a framework, wherein the catalytically active noble metal component comprises 0.3–2.0% by weight of the total weight of the catalyst under dried conditions; and wherein the organic compound is added in a solution form in an amount corresponding to the pore volume of the zeolite so that 0.5–5 moles of the organic compound can be added per mole of Al comprising the zeolite framework.

7. A method as claimed in claim 1, wherein the catalyst has a total weight, wherein an alkaline earth metal or a transition metal is further supported on the zeolite in an amount equal to 0.5–5.0% of the total weight of the catalyst under dried conditions.

8. A method as claimed in claim 7, wherein the alkaline earth metal or the transition metal is selected from the group consisting of titania, vanadia, and ceria.

9. A method as claimed in claim 1 in which the step of loading the catalytically active noble metal component on the zeolite comprises:

adding the zeolite into a solution to yield a zeolite mixture, wherein the solution comprises an amount of a solvent and the catalytically active noble metal component, wherein the amount of the solvent equals 10–30 ml for each gram of the zeolite, wherein the zeolite mixture is maintained at 50–70° C. for 1–4 hours, and then removing the solvent by a vacuum-evaporating method.

10. A methods claimed in claim 1 in which the step of loading the catalytically active noble metal component on the zeolite comprises:

adding the zeolite into a solution comprising an amount of a solvent and the noble metal component to yield a first mixture, wherein the amount of the solvent equals 50–1000 ml for each gram of the zeolite, then subjecting the first mixture to ion-exchange for 12–24 hours to yield a zeolite composition, and washing the zeolite composition with distilled water and drying the zeolite composition.

11. A method as claimed in claim 1, wherein the butyl group is a t-butyl group; and wherein the pentyl group is a t-pentyl group.

12. A method as claimed in claim 1, wherein the organic compound comprises t-butyl alcohol.

13. A catalyst for the reduction of NO$_x$, wherein the catalyst is prepared by the method claimed in claim 1, wherein the catalyst comprises the zeolite and the catalytically active noble metal component supported on the zeolite; and wherein the zeolite is filled with the organic compound.

14. A catalytic system comprising a catalyst as claimed in claim 13 for the reduction of nitrogen oxides from exhaust gas.

15. A catalytic system as claimed in claim 14, wherein the exhaust gas comprises exhaust gas from a gas turbines, exhaust gas from a boiler, or exhaust gas from an automobile.

16. A method for selective reduction of nitrogen oxides in the presence of excessive oxygen, wherein the method comprises:

activating the catalyst claimed in claim 13 through calcination at 400–600° C. in an oxygen atmosphere, and then using the catalyst for the selective reduction of NO$_x$, wherein a volume ratio of NO:natural gas:oxygen is 1:0.1 to 10:10 to 1000 and GHSV is 10,000–50,000 h$^{-1}$.

17. A catalyst for the reduction of NO$_x$, wherein the catalyst is prepared by the method claimed in claim 2, wherein the catalyst comprises the zeolite and the catalytically active noble metal component supported on the zeolite; and wherein the zeolite is filled with the organic compound.

18. A catalyst for the reduction of NO$_x$, wherein the catalyst is prepared by the method claimed in claim 3, wherein the catalyst comprises the zeolite and the catalytically active noble metal component supported on the zeolite; and wherein the zeolite is filled with the organic compound.

19. A catalyst for the reduction of NO$_x$, wherein the catalyst is prepared by the method claimed in claim 11, wherein the catalyst comprises the zeolite and the catalytically active noble metal component supported on the zeolite; and wherein the zeolite is filled with the organic compound.

20. A catalyst for the reduction of NO$_x$, wherein the catalyst is prepared by the method claimed in claim 5, wherein the catalyst comprises the zeolite and the catalytically active noble metal component supported on the zeolite; and wherein the zeolite is filled with the organic compound.

21. A catalyst for the reduction of NO$_x$, wherein the catalyst is prepared by the method claimed in claim 6, wherein the catalyst comprises the zeolite and the catalytically active noble metal component supported on the zeolite; and wherein the zeolite is filled with the organic compound.

22. A catalyst for the reduction of NO$_x$, wherein the catalyst is prepared by the method claimed in claim 7, wherein the catalyst comprises the zeolite, the catalytically active noble metal component supported on the zeolite, and the alkaline earth metal or the transition metal supported on the zeolite; and wherein the zeolite is filled with the organic compound.

23. A catalyst for the reduction of $NO_x$, wherein the catalyst is prepared by the method claimed in claim 9, wherein the catalyst comprises the zeolite and the catalytically active noble metal component supported on the zeolite; and wherein the zeolite is filled with the organic compound.

24. A catalyst for the reduction of $NO_x$, wherein the catalyst is prepared by the method claimed in claim 10, wherein the catalyst comprises the zeolite and the catalytically active noble metal component supported on the zeolite; and wherein the zeolite is filled with the organic compound.

25. A catalyst for the reduction of $NO_x$, wherein the catalyst is prepared by the method claimed in claim 11, wherein the catalyst comprises the zeolite and the catalytically active noble metal component supported on the zeolite; and wherein the zeolite is filled with the organic compound.

26. A catalyst for the reduction of $NO_x$, wherein the catalyst is prepared by the method claimed in claim 12, wherein the catalyst comprises the zeolite and the catalytically active noble metal component supported on the zeolite; and wherein the zeolite is filled with the organic compound.

27. A method for preparing a catalyst for reduction of $NO_x$ with natural gas as a reducing agent in an excess oxygen atmosphere, wherein the method comprises filling zeolite with an organic compound having a molecular weight of 100–250 prior to loading a catalytically active noble metal component on the zeolite to yield the catalyst, wherein the organic compound comprises one or more alcohols having a secondary propyl, butyl, or pentyl group, and wherein the catalyst further comprises an amount of titania and/or vanadia supported on the zeolite.

28. A method as claimed in claim 27, wherein the noble metal component comprises at least one or two metal components selected from the group consisting of metals of groups VIII and IB of the Periodic Table of the Elements.

29. A method as claimed in claim 28 in which a mixture $A_xB_y$ is formed when the two metal components are mixed, wherein x is 0,5–0.99 and y is 0.01–0.5, wherein A is palladium or gold, and wherein B is rhodium or iridium.

30. A method as claimed in claim 27, wherein the catalytically active noble metal component comprises platinum, palladium, rhodium, or gold.

31. A method as claimed in claim 27 in which the zeolite comprises an H-type zeolite having a BEA, MFI, or USY structure with an Si/Al ratio of 10–100.

32. A method as claimed in claim 27, wherein the catalyst has a total weight; wherein the zeolite has a pore volume and a framework; wherein the catalytically active noble metal component comprises 0.3–2.0% by weight of the total weight of the catalyst under dried conditions; and wherein the organic compound is added in a solution form in an amount corresponding to the pore volume of the zeolite so that 0.5–5 moles of the organic compound can be added per mole of Al comprising the zeolite framework.

33. A method as claimed in claim 27 in which the step of loading the catalytically active noble metal component on the zeolite comprises:
adding the zeolite into a solution to yield a zeolite mixture, wherein the solution comprises an amount of a solvent and the catalytically active noble metal component, wherein the amount of the solvent equals 10–30 ml for each gram of the zeolite, wherein the zeolite mixture is maintained at 50–70° C. for 1–4 hours, and
then removing the solvent by a vacuum-evaporating method.

34. A method as claimed in claim 27 in which the step of loading the catalytically active noble metal component on the zeolite comprises:
adding the zeolite into a solution comprising an amount of a solvent and the noble metal component to yield a first mixture, wherein the amount of the solvent equals 50–1000 ml for each gram of the zeolite,
then subjecting the first mixture to ion-exchange for 12–24 hours to yield a zeolite composition, and
washing the zeolite composition with distilled water and drying the zeolite composition.

35. A method as claimed in claim 27, wherein the catalyst has a total weight, and wherein the amount of titania and/or vanadia is equal to 0.5–5.0% of the total weight of the catalyst under dried conditions.

36. A catalyst for the reduction of $NO_x$, wherein the catalyst is prepared by the method claimed in claim 27, wherein the catalyst comprises the zeolite, the catalytically active noble metal component supported on the zeolite, and the amount of the titania and/or vanadia supported on the zeolite; and wherein the zeolite is filled with the organic compound.

37. A method for selective reduction of nitrogen oxides in the presence of excessive oxygen, wherein the method comprises:
activating the catalyst claimed in claim 36 through calcination at 400–600° C. in an oxygen atmosphere, and
then using the catalyst for the selective reduction of $NO_x$, wherein a volume ratio of NO:natural gas:oxygen is 1:0.1 to 10:10 to 1000 and GHSV is 10,000–50,000 $h^{-1}$.

38. A catalyst for the reduction of $NO_x$, wherein the catalyst is prepared by the method claimed in claim 29, wherein the catalyst comprises the zeolite, the catalytically active noble metal component supported on the zeolite, and the amount of the titania and/or vanadia supported on the zeolite; and wherein the zeolite is filled with the organic compound.

39. A catalyst for the reduction of $NO_x$, wherein the catalyst is prepared by the method claimed in claim 28, wherein the catalyst comprises the zeolite, the catalytically active noble metal component supported on the zeolite, and the amount of the titania and/or vanadia supported on the zeolite; and wherein the zeolite is filled with the organic compound.

40. A catalyst for the reduction of $NO_x$, wherein the catalyst is prepared by the method claimed in claim 30, wherein the catalyst comprises the zeolite, the catalytically active noble metal component supported on the zeolite, and the amount of the titania and/or vanadia supported on the zeolite; and wherein the zeolite is filled with the organic compound.

41. A catalyst for the reduction of $NO_x$, wherein the catalyst is prepared by the method claimed in claim 33, wherein the catalyst comprises the zeolite, the catalytically active noble metal component supported on the zeolite, and the amount of the titania and/or vanadia supported on the zeolite; and wherein the zeolite is filled with the organic compound.

42. A catalyst for the reduction of $NO_x$, wherein the catalyst is prepared by the method claimed in claim 34, wherein the catalyst comprises the zeolite, the catalytically active noble metal component supported on the zeolite, and the amount of the titania and/or vanadia supported on the zeolite; and wherein the zeolite is filled with the organic compound.

43. A method for preparing a catalyst for reduction of $NO_x$ with natural gas as a reducing agent in an excess oxygen atmosphere, wherein the method comprises filling zeolite with an organic compound having a molecular weight of 100–250 prior to loading a catalytically active noble metal component on the zeolite to yield the catalyst, wherein the organic compound comprises t-butyl alcohol, and wherein the catalyst further comprises an amount of titania and/or vanadia supported on the zeolite.

44. A method as claimed in claim 43, wherein the noble metal component comprises at least one or two metal components selected from the group consisting of metals of groups VIII and IB of the Periodic Table of the Elements, wherein a mixture $A_xB_y$ is formed when the two metal components are mixed, wherein x is 0.5–0.99 and y is 0.01–0.5, wherein A is palladium or gold, and wherein B is rhodium or iridium.

45. A method as claimed in claim 43, wherein the catalytically active noble metal component comprises platinum, palladium, rhodium, or gold.

46. A catalyst for the reduction of $NO_x$, wherein the catalyst is prepared by the method claimed in claim 43, wherein the catalyst comprises the zeolite, the catalytically active noble metal component supported on the zeolite, and the amount of the titania and/or vanadia supported on the zeolite; and wherein the zeolite is filled with the organic compound.

47. A catalyst for the reduction of $NO_x$, wherein the catalyst is prepared by the method claimed in claim 44, wherein the catalyst comprises the zeolite, the catalytically active noble metal component supported on the zeolite, and the amount of the titania and/or vanadia supported on the zeolite; and wherein the zeolite is filled with the organic compound.

48. A catalyst for the reduction of $NO_x$, wherein the catalyst is prepared by the method claimed in claim 45, wherein the catalyst comprises the zeolite, the catalytically active noble metal component supported on the zeolite, and the amount of the titania and/or vanadia supported on the zeolite; and wherein the zeolite is filled with the organic compound.

49. A method for preparing a catalyst for reduction of $NO_x$ with natural gas as a reducing agent in an excess oxygen atmosphere, wherein the method comprises filling zeolite with an organic compound having a molecular weight of 100–250 prior to loading a catalytically active noble metal component on the zeolite to yield the catalyst, wherein the organic compound comprises one or more alcohols having a secondary propyl, butyl, or pentyl group, and wherein the catalyst further comprises an amount of titania supported on the zeolite.

50. A method as claimed in claim 51, wherein the catalyst has a total weight, and wherein the amount of the titania is equal to 0.5–5.0% of the total weight of the catalyst under dried conditions.

51. A method as claimed in claim 49, wherein the catalytically active noble metal component comprises platinum, palladium, rhodium, or gold.

52. A catalyst for the reduction of $NO_x$, wherein the catalyst is prepared by the method claimed in claim 49, wherein the catalyst comprises the zeolite, the catalytically active noble metal component supported on the zeolite, and the amount of the titania supported on the zeolite; and wherein the zeolite is filled with the organic compound.

53. A catalyst for the reduction of $NO_x$, wherein the catalyst is prepared by the method claimed in claim 50, wherein the catalyst comprises the zeolite, the catalytically active noble metal component supported on the zeolite, and the amount of the titania supported on the zeolite; and wherein the zeolite is filled with the organic compound.

54. A catalyst for the reduction of $NO_x$, wherein the catalyst is prepared by the method claimed in claim 51, wherein the catalyst comprises the zeolite, the catalytically active noble metal component supported on the zeolite, and the amount of the titania supported on the zeolite; and wherein the zeolite is filled with the organic compound.

55. A method for preparing a catalyst for reduction of $NO_x$ with natural gas as a reducing agent in an excess oxygen atmosphere, wherein the method comprises filling zeolite with-an organic compound having a molecular weight of 100–250 prior to loading a catalytically active noble metal component on the zeolite to yield the catalyst, wherein the organic compound comprises t-butyl alcohol, and wherein the catalyst further comprises an amount of titania supported on the zeolite.

56. A method as claimed in claim 55, wherein the catalytically active noble metal component comprises platinum, palladium, rhodium, or gold.

57. A catalyst for the reduction of $NO_x$, wherein the catalyst is prepared by the method claimed in claim 56, wherein the catalyst comprises the zeolite, the catalytically active noble metal component supported on the zeolite, and the amount of the titania supported on the zeolite; and wherein the zeolite is filled with the organic compound.

\* \* \* \* \*